Dec. 16, 1947.   F. H. WALDEN   2,432,703
PIPE CUTTING DEVICE
Filed Aug. 17, 1943   3 Sheets-Sheet 3
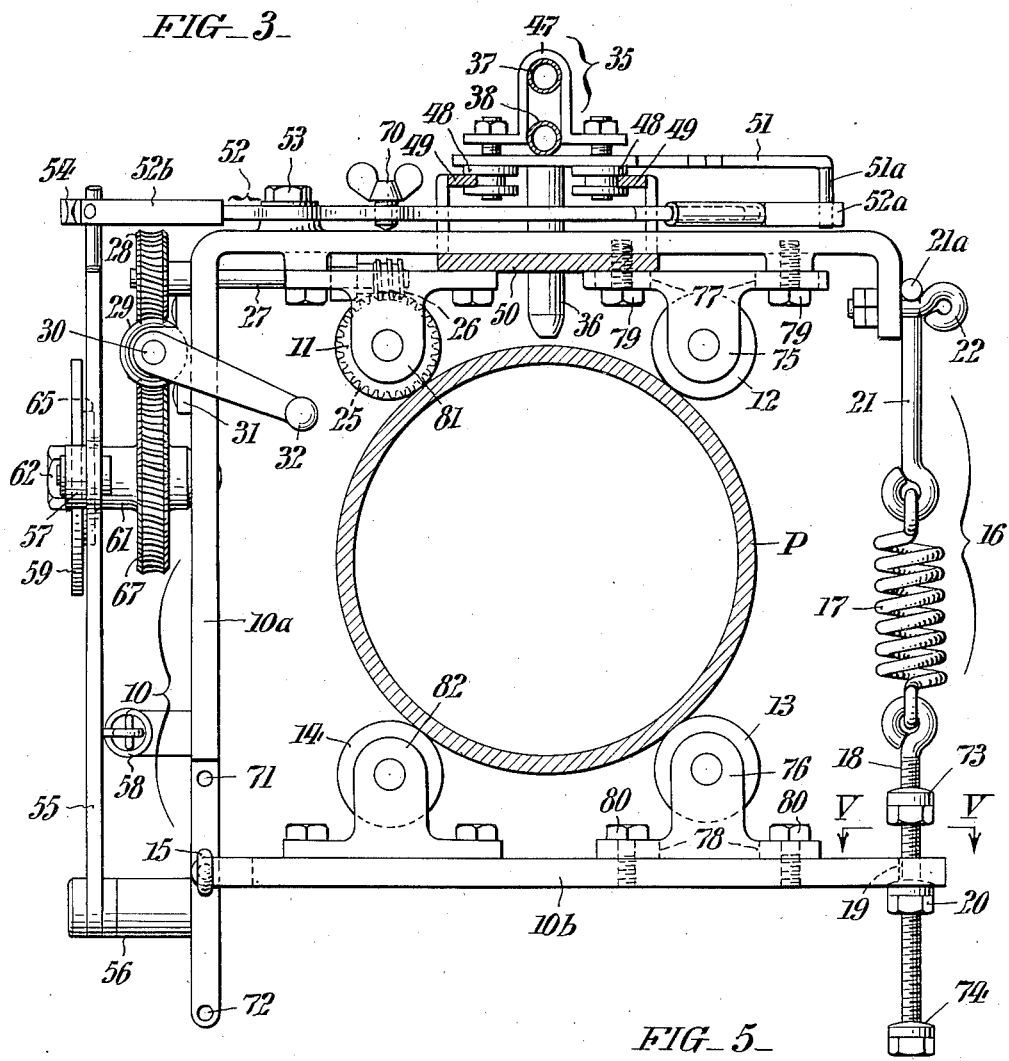
FIG_3_
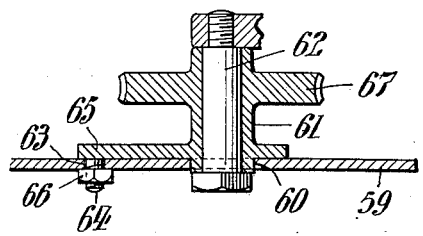
FIG_4_
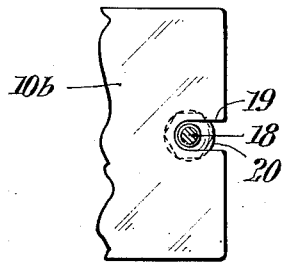
FIG_5_
INVENTOR:
Frank H. Walden,
BY
ATTORNEYS.

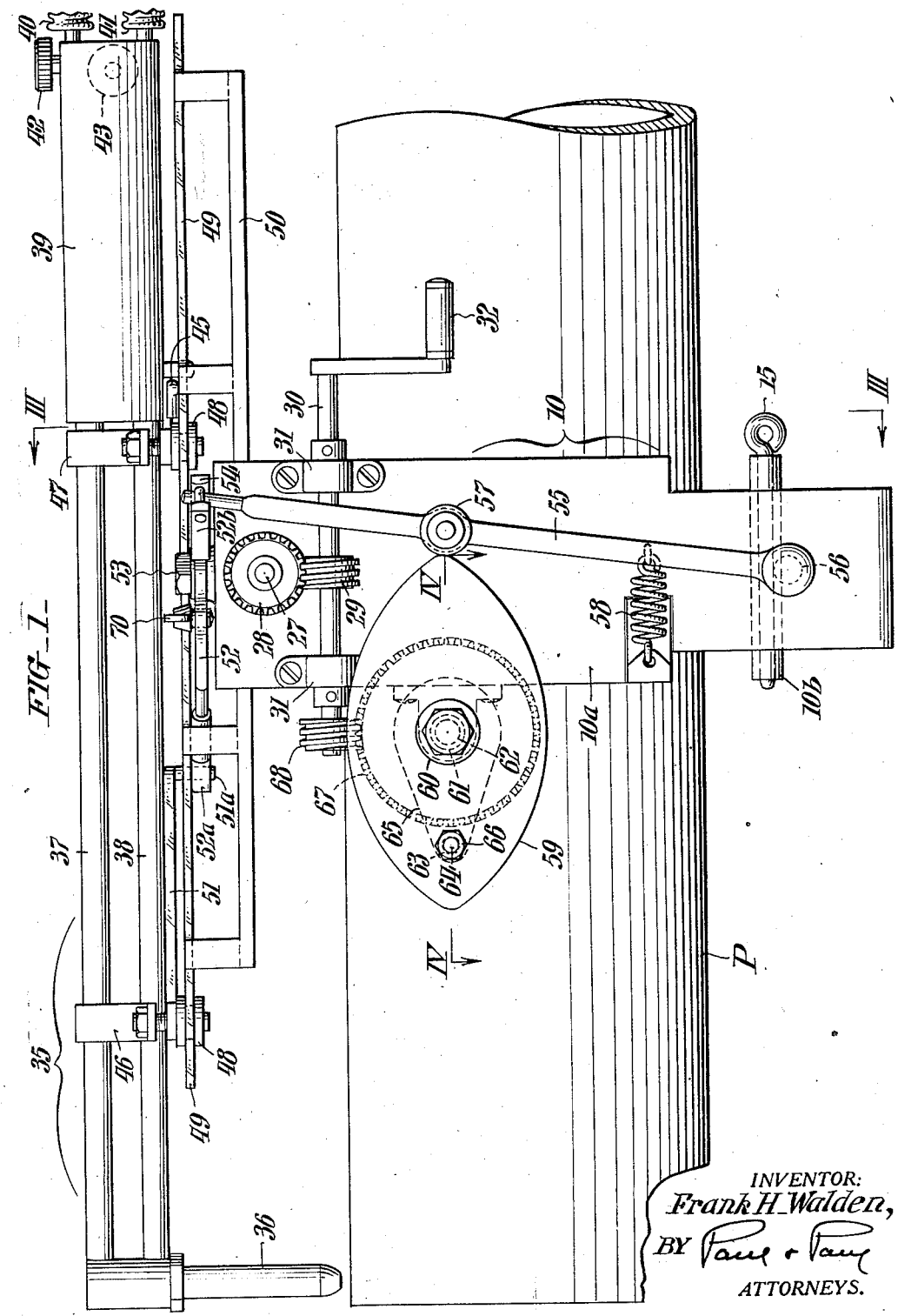

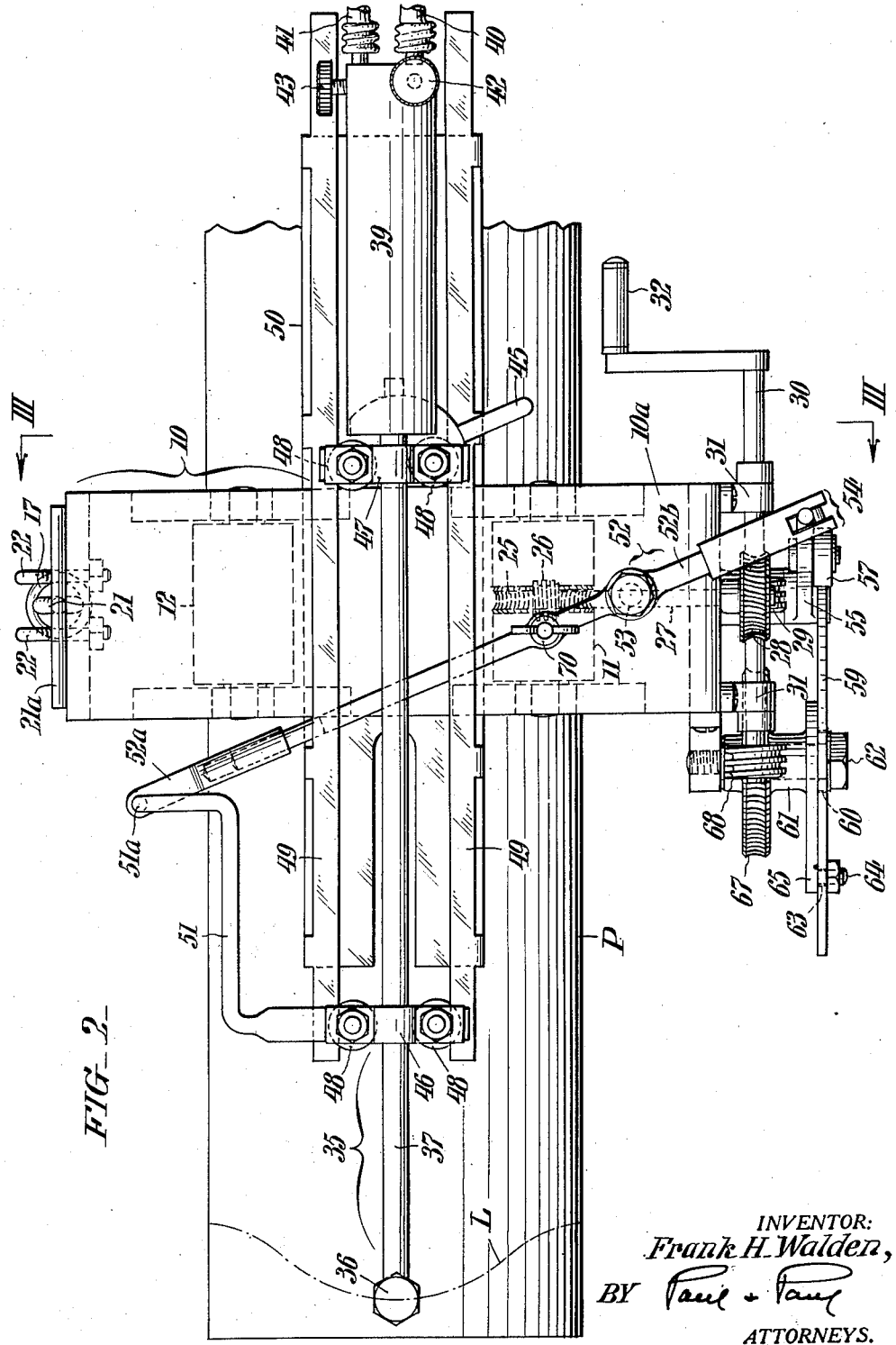

Patented Dec. 16, 1947

2,432,703

UNITED STATES PATENT OFFICE 2,432,703

PIPE CUTTING DEVICE

Frank H. Walden, Philadelphia, Pa.

Application August 17, 1943, Serial No. 498,965

6 Claims. (Cl. 33—21)

This invention relates to pipe cutting devices, that is to say to devices or machines useful in cutting pipes either straight across or in variously shaping their ends for joinder with other pipes at different angles.

The chief aim of my invention is to enable work of the kind referred to to be accurately performed in a minimum of time and without necessitating any special skill on the part of the operative.

This desideratum I make possible of realization in practice through provision of a simple and inexpensive device which is mountable about the pipe to be cut, and which will effect the cutting incident to being bodily revolved about such pipe. In the embodiment hereinafter more fully disclosed, my improved cutting device is characterized by having an annularly-arranged series of rollers for engaging the surface of the pipe, and means for driving one or more of the rollers for tractive action with the pipe surface, together with means for incidentally causing a blow torch or other cutting element to follow a prescribed path in accordance with the shape of cut desired as the device is bodily revolved.

In connection with a cutting device organized as just briefly outlined, it is a further aim of my invention to provide adjustment facilities whereby the device can be adapted for operation upon pipes of different diameters, as well as interchangeable facilities for determining cuts of different shapes.

Other objects and attendant advantages will appear from the following detailed description of the attached drawings, wherein Fig. 1 is a view in side elevation of a pipe cutting device conveniently embodying my invention.

Fig. 2 shows the device in top plan.

Fig. 3 is a cross section taken as indicated by the angled arrows III—III in Figs. 1 and 2.

Figs. 4 and 5 are fragmentary detail sections taken as respectively indicated by the angled arrows IV—IV and V—V in Figs. 1 and 3.

From these illustrations it will be noted that my improved cutting device has an open frame 10 which is adapted to be placed about the pipe or tube P to be cut, and which carries a group of circumferentially arranged rollers 11, 12, 13 and 14 for engaging the outer surface of said pipe. The frame 10 is composed of two parts or components 10a and 10b (Fig. 3), the former of these being of right angular configuration, and the latter being straight and pivotally connected by a retractible hinge pin 15 to the first. A yielding coupling (Fig. 3) generally designated 16 serves to draw the free ends of the frame components 10a and 10b toward each other thereby to keep the rollers 11—14 in firm rolling contact with the pipe P. As shown, the coupling 16 includes a helical tension spring 17 to the lower end of which is attached an eye bolt 18 whereof the shank passes through a bifurcation 19 in the free end of the frame component 10b and is provided with a stop in the form of a nut collar 20 for said component. The coupling means 16 further includes a T-piece 21 whereof the stem is connected to the upper end of the spring 17 so that the ends of its cross bar 21a may be engaged over headed keeper stud projections 22 at the free end of the frame component 10a. This arrangement obviously makes possible quick mounting of the device over and around the pipe P in readiness for the cutting, as well as quick removal after completion of the cutting operation.

During the cutting, the device is bodily rotated about the pipe P through tractive action of the roller 11 which is driven by the means about to be described. Formed centrally of the roller 11 is a worm gear wheel 25 that meshes with a driving worm 26 at the inner end of a shaft 27 which passes through an upright leg (as considered in Fig. 3) of the frame component 10a. A worm gear wheel 28 on the outer end of the shaft 27 meshes in turn with a worm 29 medially of a transverse shaft 30 which is journaled in bearings 31 at the outside of the vertical leg of the frame component 10a, see Figs. 1 and 3, and which is provided at one end with an actuating crank 32 for the purpose of manual operation.

The means employed in the illustrated instance for cutting is in the form of a standard blow torch 35 whereof the nozzle is indicated at 36, the gas and compressed air-delivering tubes at 37 and 38, and the body or butt at 39. As ordinarily, the gas and compressed air are conducted into the rear end of the torch 35 through flexible conduits 40 and 41, regulation being effected by individually adjustable hand valves at 42 and 43. An actuating means 45 is also provided for controlling the flow of air to blow away the molten metal of the pipe P upon fusion by the torch. To the torch pipes 37 and 38 are secured in spaced relation a pair of bridging clamps 46 and 47 having peripherally-grooved wheels 48 in engagement with a pair of spaced parallel track rails 49 aligned in the direction of the pipe P, and which are supported at an elevation by a bed plate 50 affixed to the horizontal leg (Fig. 3) of the frame component 10a. Extending laterally and rearwardly from the front clamp 46 of the torch is an arm 51 with a downwardly-extending rounded terminal shank portion 51a which pivotally engages the long extremity 52a of a double armed lever 52 fulcrumed at 53 on the horizontal leg of the frame component 10a. The other or shorter extremity 52b of the lever 52 is bifurcated at 54 for engagement by the swinging end of a lever 55 fulcrumed at 56 on the vertical leg of the frame component 10a. At an intermediate point the lever 55 carries a roller 57, which, by influence of a spring 58 (Figs. 1 and 3) upon said lever, is maintained in engagement with the edge of a rotary cam 59. As shown in Figs. 1 and 4, the cam 59 is in the form of a plate which is centrally apertured at 60 to fit the outer end of a sleeve 61 which is freely revolvable about a stud 62 projecting laterally from the vertical leg of the frame component 10. The cam plate 59 is moreover provided with an eccentrically disposed aperture 63 for fitment over a stud projection 64 on an arm 65 secured to the sleeve 61, and is held in place by a nut 66 threadedly engaging said stud. Also affixed to the sleeve 61 and disposed behind the arm 65 is a worm wheel 67 which meshes with a driving worm 68 on the shaft 30 (previously mentioned) at the end of the latter opposite to that occupied by the crank handle 32. Through rotation of the cam 59 and attendant swinging of the levers 55 and 52 it will be seen that the torch 35 will be moved back and forth in the track and the torch nozzle 36 caused to cut the pipe along a line L (Fig. 2) as the device is bodily revolved about the pipe, the shape of the cut corresponding to the contour of said cam. Cuts of different shapes may be had by substituting other cams of suitable contour for the type of cam 59 herein illustrated. When a straight cross cut is desired, the burner may be temporarily fixed against movement by tightening a winged screw 70 (see Fig. 3) whereof the shank is threadedly engaged in the lever 52 and adapted to bind against the horizontal leg of the frame component 10a.

In order that the device may be used to cut pipes of several different diameters, I have provided the upright leg of the frame component 10a with additional holes 71 and 72 (Fig. 3) for selective engagement by the hinge pin 15, and the eye bolt with additional stop collars 73 and 74 for the frame component 10b. Also for the same purpose the rollers 12 and 13 have been made adjustable relative to the rollers 11 and 14 respectively through slotting of their bearings 75 and 76 at 77 and 78 for passage of the shanks of the securing bolts 79 and 80, the bearings 81 and 82 of the rollers 11 and 14 being fixed.

It is to be understood that I do not wish to be limited to the precise details of construction herein shown and described by way of example since various modifications are possible within the scope of the appended claims without departure from the spirit of my invention. It is further to be understood that the device as herein shown is not necessarily restricted in its use to cutting, since, by substituting a stylus for the nozzle of the blow torch, it may be employed in marking pipes as may be desired preparatory to performing other operations upon them.

Having thus described my invention, I claim:

1. A device for moving an instrument such as a torch or a scriber over the surface of a pipe to cut it or to mark a pattern thereon, a jaw-like frame including with two interpivoted components capable of being mounted over the pipe from one side and supporting the instrument, said components jointly carrying a group of circumferentially arranged rollers to bear on the outer surface of the pipe; releasable means for yieldingly drawing the jaw ends of the frame components toward each other at the opposite side of the pipe to maintain the rollers in effective tractional contact with the pipe surface; and mechanism also supported by the frame for driving one of the rollers to rotate the device bodily about the pipe.

2. The invention according to claim 1, wherein the components of the frame are adjustable relative to each other to enable adaptation of the device to pipes of different diameters.

3. The invention according to claim 1, further including means on the frame and connected to the driving mechanism for reciprocating the torch or scriber longitudinally of the pipe simultaneously with bodily rotation of the device about said pipe.

4. The invention according to claim 1, further including rotary cam means connected to the driving mechanism for variantly shifting the torch or scriber back and forth longitudinally of the pipe to determine the shape of the cut or of the marking simultaneously with bodily rotation of the device about said pipe.

5. A device for moving an instrument such as a torch or scriber over the surface of a pipe to cut it or mark a pattern thereon, including an open frame with separable components supporting the instrument and jointly carrying a group of circumferentially arranged rollers to bear on the surface of the pipe; means for yieldingly drawing the frame components toward each other to maintain the rollers in effective tractional contact with the pipe surface; mechanism also supported by the frame for driving one of the rollers to rotate the device bodily about the pipe; a guide on the frame for confining the instrument to movement longitudinally of the pipe; a cam with an irregular peripheral contour rotatably mounted on the frame and actuated from the driving mechanism; and means including a lever pivoted on the frame and actuated by the cam for variantly shifting the instrument along its guide to determine the shape of the marking or cut incident to bodily rotation of the device about said pipe.

6. The invention according to claim 5 including a shaft journaled in the frame and having a mounting thereon; and means by which the cam is secured to the mounting with capacity for ready detachment so that other cams of different shapes may be substituted therefor.

FRANK H. WALDEN.

REFERENCES CITED

The following references are of record in the file of this patent:

UNITED STATES PATENTS

| Number | Name | Date |
|---|---|---|
| 1,542,887 | Irvin et al. | June 23, 1925 |
| 1,879,346 | Lawrence | Sept. 27, 1925 |
| 1,885,107 | Brown | Nov. 1, 1932 |
| 1,992,529 | Day | Aug. 15, 1933 |
| 1,954,549 | Twigg et al. | Apr. 10, 1934 |
| 2,057,612 | Formont | Oct. 13, 1936 |